10

United States Patent Office 2,877,192
Patented Mar. 10, 1959

2,877,192

POLYURETHANE POLYMER CONTAINING A METALLIC DICYANAMIDE

John Burkus, Pompton Plains, N. J., assignor to United States Rubber Company, New York, N. Y., a corporation of New Jersey No Drawing. Application November 26, 1956
Serial No. 624,208

4 Claims. (Cl. 260—2.5)

This invention relates to rubbers of the polyesterurethane type, and more particularly it relates to the preservation of such rubbers against deterioration, especially by moisture and light, with the aid of a metallic dicyanamide.

As is well known, rubbers of the polyester-urethane type are commonly made by reacting a polyester with a diisocyanate. These rubbers have many desirable qualities, but they suffer from the disadvantage of deteriorating after a period of time. Thus, polyurethane rubber foams made with a polyester backbone degrade in the presence of atmospheric moisture. This deficiency has been noted in the literature (Brockhagen, Kunststoffe 44, 555-8, December 1954). As degradation progresses, the foams become softer and tend to acquire permanent set when deformed. Degradation of this type has been observed in samples stored on an open shelf while control samples stored in a desiccator over a drying agent did not change at all. The change in properties during shelf aging is a very serious matter, and occurs in the solid rubber as well as in foam. It has impeded large scale exploitation of polyester-urethane rubbers by the whole rubber industry in this country.

As an example of this deterioration, a sample of polyester-urethane foam lost 15% of its original modulus during a six month shelf aging period and 33% of its original modulus during a 15 month period. The degradation is accelerated by an increase in temperature and/or humidity. Thus, many samples of polyester-urethane foam aged at 70° C. in an atmosphere of 95% relative humidity have been observed to lose 10-30% of their original modulus in one week, the extent of degradation depending at least partly upon the catalyst used in preparing the foam. Heating at 70° C. over water is a method which is used generally throughout the rubber industry as an accelerated aging test for polyurethane rubber.

Exposure to light also has a definite undesirable effect on polyester-urethane rubbers. The rubbers tend to discolor, becoming extremely dark after direct exposure to ultra-violet light for a period of time.

I have attempted without success to forestall such degration by adding various materials to the polyester-urethane composition. These materials included iron oxide, barium stearate, calcium carbonate, zinc oxide, magnesium oxide, lead carbonate, lead stearate, dibasic lead stearate, barium cadmium stearate, and mica. None of these helped and indeed the lead, zinc, magnesium and cadmium compounds were actually detrimental. Various organic compounds were also tested, but they were not beneficial.

However, I have now very surprisingly and unexpectedly discovered that metallic dicyanamides, when added to the polyester-urethane rubber composition, have a remarkable inhibiting effect on the degration of such compositions. The metallic dicyanamides, in both the solid and the foamed polyester-urethane rubbers greatly diminish the deteriorating effects of moisture and the discoloration by light. A particularly preferred metallic dicyanamide is sodium dicyanamide, $NaN(CN)_2$, which is a commercially available material.

The invention is applicable to any conventional polyester-urethane rubber composition. The polyester used in such preparations is typically made from a glycol, for example from a mixture of ethylene and propylene glycols, and an aliphatic saturated dicarboxylic acid, for example, adipic acid, using an excess of glycol over the acid so that the resulting polyester contains terminal alcoholic hydroxyl groups. Such polyester may be linear, or it may be branched, the latter effect being achieved by including in the preparation a trialcohol, such as trimethylolpropane or trimethylolethane. Usually such an amount of glycol is used as to give the polyester having a hydroxyl number of 20 to 120, and preferably 36 to 67, and a low acid value less than 2 and preferably less than 1. The molecular weight of the polyester preferably ranges from 1700 to 3000. Polyester-polyamides, polyester-polyethers and polyetherglycols, having terminal alcoholic hydroxyl groups, may be used in place of part of the polyester. The polyester or the like is reacted with a polyisocyanate, for example, triphenylmethane triisocyanate, tolylene diisocyanate, naphthalene 1,5-diisocyanate, or p,p'-diphenylmethane diisocyanate, using a considerable molar excess, commonly from a 20% to a 250% and preferably from a 50% to a 100% molar excess, of the polyisocyanate over that amount which would be required to react with all of the alcoholic hydroxyl groups furnished by the polyester. The reaction is frequently effected by heating a mixture of the polyester, or similar high molecular weight compound having two or more alcoholic hydroxyl groups per molecule, and the polyisocyanate under anhydrous conditions at an elevated temperature, e. g. 70–150° C., to form a soluble, uncured, material which is a polyurethane having terminal isocyanate groups.

The polyisocyanates employed in preparing the polyester-polyisocyanate product are generally diisocyanates, for example, polymethylene diisocyanates such as ethylene diisocyanate, hexamethylene diisocyanate and tetramethylene diisocyanate; alkylene diisocyanates such as propylene-1,2-diisocyanate; cycloalkylene diisocyanates such as 1,4-di-isocyanatocyclohexane, as well as aromatic diisocyanates such as m- and p-phenylene diisocyanate toluene diisocyanate, p,p'-diphenyl diisocyanate and 1,5-naphthylene diisocyanate, in which category we include aliphatic-aromatic diisocyanates such as p,p'-diphenylmethane diisocyanate, meta or para xylylene diisocyanate, and phenylethane diisocyanate

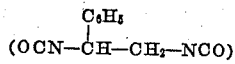

Triisocyanates are also suitable, such as those having isocyanate groups attached to a trivalent hydrocarbon radical, whether an aliphatic, aromatic, or aliphatic-aromatic radical as in butane-1,2,2-triisocyanate, benzene-1,3,5-triisocyanate, diphenyl-2,4,4'-triisocyanate, diphenyl-4,6,4'-triisocyanate, toluene-2,4,6-triisocyanate, ethyl benzene-2,4,6-triisocyanate and triphenylmethane 4,4', 4"-triisocyanate. Triisocyanates derived from corresponding substituted trivalent hydrocarbon radicals, such as monochlorobenzene-2,4,6-triisocyanate may also be used.

Many such polyester-polyisocyanate intermediate products hereinafter referred to as the uncured polyurethane or polyurethane intermediate, can be thus prepared in the form of liquids; others are normally solids.

In many cases it is found to be highly advantageous to include in the polyurethane elastomer preparation (in addition to the diisocyanate and the polyester), a small amount of an agent capable of forming urea linkages in the polymer. In general, such urea linkage forming agents are materials capable of condensing with the diisocyanate to yield at least one ureylene group

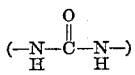

Although such agents should be bifunctional with respect to isocyanate, i. e., possess two available active hydrogen atoms, it is not necessary that these reactive groups both be —$NH_2$ groups. They are believed to act by combining with available isocyanate groups on different molecules of the elastomer, or with available isocyanate groups on different parts of the same molecule of the elastomer thus increasing the chain length of the polymer. The bifunctional ureylene linkage forming agents are suitably employed in an amount varying in specific cases from 0 to 3.5 mole per mole of polyester used but preferably, when used at all, varying from .10 to .60 mole per mole of polyester. Examples of such reagents are (a) aromatic diamines such as p,p'-diaminodiphenyl methane, (b) aromatic aminophenols or aminoalcohols such as p-aminophenol, m-aminophenol, and p-aminobenzyl alcohol, (c) aliphatic diamines such as hexamethylenediamine, (d) aliphatic amino alcohols such as ethanolamine, (e) diamides such as adipamide or urea, and (f) water.

In the most typical practice of the foregoing modification of the invention, the addition of the ureylene linkage forming agent is generally delayed until after the initial reaction of the diisocyanate and polyester. The treatment with the ureylene linkage forming agent is suitably carried out while masticating the elastomer in a suitable heavy duty mixer, generally while heating the mixture (usually to a temperature of, for example, 20° to 200° C.).

Other modifying ingredients may be present during the preparation.

In most cases, it is desirable to accelerate or promote the reaction between the diisocyanate and the polyester, and this may be done with the aid of certain catalytic materials. Known catalysts for this reaction include the soluble heavy metal salts, and the tertiary amines, the latter being preferred. Examples of such catalysts are cobalt naphthenate, triethylamine, diethyl cyclohexylamine, N-methyl morpholine, N,N'dimethyl piperazine, di-(beta-diethylaminoethyl) adipate, 2-hydroxypropyl-N-(3-dimethylaminopropyl) carbamate, and N,N'-hexamethylene di-(beta-diethylaminoethyl carbamate). Such catalysts are particularly necessary when preparing the foamed product.

The reaction of the polyester with the diisocyanate is usually carried out under substantially moisture-free conditions, although water itself in controlled amounts may of course also be employed as one of the reactants under proper conditions, to serve as a ureylene linkage former, in the above disclosed modification of the invention. If the starting materials are not substantially anhydrous, their water content should preferably be predetermined rather carefully, so that such water can be taken into account. Excess polyisocyanate is then added to correspond to this amount.

As is well known, the polyurethane intermediate containing available isocyanate groups is capable of being cured by the action of various initiators of cross-linking, usually chemicals containing two or more hydrogen atoms available for reaction with the available isocyanate groups, notably water, or organic chemicals in general containing two or more —OH and/or —$NH_2$ and/or —SH groups. Among such known curing agents may be mentioned polyamines, notably primary diamines, such as hexamethylene diamine, p-phenylene diamine, p,p'-diaminodiphenylmethane, o-dichlorobenzidine, and tolylenediamine; polyhydric alcohols, notably diols, such as butanediol; and polymercaptans such as hexamethylene dithiol. Compounds with mixed functional groups are also used, notably amino alcohols, such as amino ethanol and p-amino-phenylmethylcarbinol. Peroxides also have a curing effect.

When it is desired to make a foamed product, the curing agent is appropriately comprised for the most part of water, since water is unique among the foregoing agents in causing the release of carbon dioxide gas during the cure so that the polyurethane becomes blown or expanded.

Although the cure of the polyester-polyisocyanate intermediate to form the elastic polyurethane proceeds at room temperature, the reaction is slow and in practice we apply heat to the mass to accelerate the cure. Thus, by heating to temperatures of, for example, 212 to 300° F., substantial cure can be effected in as little as 5 to 10 minutes, but if less highly elevated temperatures are employed, e. g., 125° F., longer times, such as 1 to 3 hours may be required to effect appreciable cure. Exposure of the mass to open steam or to steam under pressure in an autoclave is a convenient way of supplying simultaneously the water vapor required for curing as well as the elevated temperature desired to shorten the time of cure.

In some cases the synthetic elastomeric polyurethane polymer is made by reacting together in suitable fashion (1) a polyester or polyester amide, (2) a bifunctional compound like a diamine, and (3) a diisocyanate, such as naphthylene-1,5-diisocyanate or p,p'-diphenylmethane diisocyanate to give an uncured elastomeric product, and effecting curing of the resulting uncured reaction product by intimately admixing therewith an organic polyisocyanate, generally a diisocyanate identical with that previously employed, in amount sufficient to effect curing, often in amount such as to bring the total number of —NCO equivalents in the cured composition to around three equivalents of —NCO per mole of polyester or polyester amide, and subjecting the resulting mixture to heat and pressure.

Instead of first preparing in a separate step an intermediate product or prepolymer from the polyester and the diisocyanate, and then adding a curing agent in a distinct subsequent step, I may blend all the desired ingredients at once. This is frequently done in preparing casting compositions for foamed-in-place elastomer.

In accordance with the invention, there is included in any of the foregoing compositions, at any convenient stage in the preparation thereof, but in any case prior to curing, a small amount of a metallic dicyanamide.

Pigments, fillers, and other compounding or modifying ingredients may also be present.

The following examples will serve to illustrate the practice of the invention in more detail.

EXAMPLE 1

In this example, polyester-urethane foams were made in accordance with the following recipe:

| | Parts |
|---|---|
| Polyester | 100 |
| Tolylene diisocyanate (mixture of 2,4 and 2,6 isomers, 65/35) | 30 |
| Emulphor EL-719 [1] | 0.3 |
| Catalyst (see Table I) | 1-3 |
| $NaN(CN)_2$ | Variable |
| Water | 2 |

[1] Emulphor EL-719 is polyoxyethylated vegetable oil and serves the purpose of stabilizing the foam against collapse while it is being formed. Compound 4 (Table I) contained two parts oleic acid in place of Emulphor EL-719.

The polyester is made as follows:

Charge:

| | Moles |
|---|---|
| Adipic acid | 1.0 |
| Diethylene glycol | 1.1-2.5 |
| Trimethylolethane | 0.085 |

The mixture is heated in an inert atmosphere, and water is distilled off until an acid number of about 2 is obtained. Vacuum is then applied, and excess diethylene glycol is distilled off until a hydroxyl number of about 60 is obtained. The reactor temperature should not be allowed to go above 230° C. The polyester has a viscosity of about 18,000 centipoises at 25° C. In general, any fluid polyester or the like with a low acid number (0-10), and with viscosity characteristics suitable for forming a stable foam, may be used.

The foam samples used in obtaining the data for Table I were made in the following manner. Fifty gram batches of polyester were weighed into one pint paper cups, to which were added 0.5 ml. N-methyl morpholine or a similar quantity of another tertiary amine, 0.15 ml. Emulphor EL-719, 1.0 ml. water and 0 to 2.5 grams dry, powdered sodium dicyanamide. These materials were then mixed for 5-10 seconds using a simple laboratory stirrer of the propeller type. Then 12.5 ml. (15 grams) of tolylene diisocyanate was added and mixing continued for 15-20 seconds. The mixer was withdrawn and the foam rose in about two minutes to a volume greater than that of the cups. The reaction was exothermic and a maximum temperature of 110° C. was sometimes measured in the center of the foam. This temperature was usually reached about five minutes after the last ingredient was added. The foams were self-curing so no additional heating was used.

An alternative method which is used when larger pieces of foam are needed is as follows. Polyester is premixed with sodium dicyanamide, water, catalyst and Emulphor EL-719. This mixture is then supplied through a metering pump to a small-volume mixing chamber containing a rapidly rotating (about 1000 R. P. M.) internal mixer with small clearances. Tolylene diisocyanate is simultaneously metered in the proper proportion into the mixing chamber. The rate of input is adjusted to the free volume of the mixing chamber, so that the hold-up time is of the order of 5-10 seconds. The well mixed product issues from the mixer as a clear liquid. It is collected in molds where it quickly expands and assumes the mold shape.

The polyester-urethane foams were subjected to accelerated humid aging tests. The samples tested were allowed to remain at room temperature at least a week but not more than four weeks before the start of the aging tests. Results of tests are shown in the following Table I, which shows the loss in modulus on aging.

Table I shows that there are variations in initial softness with different catalysts and there are also differences in rates of degradation in the accelerated humid aging test. The effect of catalyst on softness is both surprising and mysterious. No explanation has been offered. Differences in the sensitivity to moisture which result from the use of different catalysts may be related to the catalyst volatility, its degree of alkalinity and the nature of products of hydrolysis of the catalyst itself. It is important to note that sodium dicyanamide improves the moisture resistance in every case.

Table I

| Catalyst | $NaN(CN)_2$ Parts/100 polyester | Foam Properties | | Percent Modulus Lost After Aging at 70° C. over Water | | | | | | | | |
|---|---|---|---|---|---|---|---|---|---|---|---|---|
| | | Density, lbs./ft.³ | L25, lbs./in.² | 1 Week | 2 Weeks | 3 Weeks | 4 Weeks | 5 Weeks | 6 Weeks | 7 Weeks | 8 Weeks | 9 Weeks |
| Compound 1 | 0 | 3.8 | 0.99 | 16 | 39 | 60 | 77 | | | | | |
| | 0.1 | 3.6 | 0.81 | 11 | 32 | 51 | 70 | | | | | |
| | 0.5 | 3.7 | 0.72 | 10 | 24 | 37 | 53 | 67 | 80 | | | |
| N-methyl morpholine (1 Part/100 polyester) | 1.0 | 3.8 | 0.97 | 23 | 29 | 41 | 49 | 40 | 74 | | | |
| | 2.0 | 3.7 | 0.72 | 8 | 16 | 32 | 37 | | 53 | | 81 | |
| | 3.0 | 4.2 | 0.85 | 7 | 10 | 28 | 30 | | 52 | | 73 | 85 |
| | 4.0 | 4.2 | 0.74 | 9 | 17 | 25 | 31 | | 50 | | 73 | 79 |
| | 5.0 | 3.8 | 0.67 | 4 | 15 | 19 | 30 | | 49 | | 68 | 74 |
| Compound 2 | 0 | 3.4 | 0.55 | 10 | 28 | 51 | 70 | | | | | |
| 2-Hydroxypropyl N-(3-dimethylaminopropyl) carbamate (0.6 Part/100 polyester) | 0.1 | 3.6 | 0.54 | 8 | 18 | 40 | 61 | 79 | | | | |
| | 0.5 | 3.4 | 0.51 | 8 | 19 | 39 | 56 | 75 | | | | |
| | 1.0 | 3.6 | 0.54 | 8 | 18 | 29 | 45 | 63 | 77 | | | |
| | 2.0 | 3.6 | 0.52 | 6 | 11 | 24 | 35 | 41 | 60 | 70 | | |
| Compound 3 | 0 | 3.3 | 0.64 | 22 | 38 | 49 | 62 | 76 | | | | |
| N,N'-hexamethylene di(beta-diethylaminoethyl carbamate) (2 parts/100 polyester) | 0.1 | 3.3 | 0.68 | 23 | 33 | 44 | 60 | 75 | | | | |
| | 0.5 | 3.3 | 0.50 | 11 | 19 | 31 | 47 | 56 | 75 | | | |
| | 1.0 | 3.8 | 0.54 | 10 | 16 | 26 | 34 | 45 | 58 | 66 | | |
| | 2.0 | 3.9 | 0.52 | 5 | 8 | 27 | 40 | 54 | 68 | 81 | | |
| Compound 4 | 0 | 4.9 | 1.08 | 34 | 60 | 100 | | | | | | |
| Reaction product of adipic acid (1 mole) and diethyl aminoethanol (2 moles) to acid number of 25. Principally the diester di-(diethyl aminoethyl) adipate | 0.1 | 3.9 | 0.75 | 28 | 55 | | | | | | | |
| | 0.5 | 4.4 | 0.80 | 20 | 41 | | | | | | | |
| | 1.0 | 4.6 | 0.97 | 19 | 40 | | | | | | | |
| | 1.0 | 3.7 | ¹0.44 | 10 | 39 | 58 | | | | | | |
| | 2.0 | 4.2 | 0.64 | 16 | 27 | 42 | 64 | 80 | | | | |
| | 2.0 | | | 11 | 33 | 50 | | 100 | | | | |

¹ Made with 80/20 mixture of 2,4/2,6 toluene diisocyanate isomers.
L25 is the load in lbs./in.² required to compress the foam 25%.

The above table shows the inhibiting effect of the compound sodium dicyanamide, $NaN(CN)_2$, on accelerated degradation by moisture. The degree of inhibition is roughly proportional to the amount used.

Table II shows the beneficial effect of $NaN(CN)_2$ in retarding discoloration. These data were obtained on samples of compound 1, Table I, which had been in the fadeometer for 24 hours.

Table II

| Sample | Sample Side | Percent Reflectance (450 mu) |
|---|---|---|
| Control (no NaN(CN)$_2$) | Exposed to Arc | 6.45 |
|  | Back | 22.2 |
| Containing 2 parts NaN(CN)$_2$ | Exposed to Arc | 15.5 |
|  | Back | 45.2 |

EXAMPLE 2

This example shows the effectiveness also of the dicyanamides of calcium, magnesium, barium and strontium (all alkali or alkaline earth metals), whereas the dicyanamides of metals which are harmful per se, such as those of tin, zinc and lead, are shown to be unsatisfactory. The polyester employed is generally similar to that used in the previous example. The formulation of the foamed material was as follows:

|  | Parts |
|---|---|
| Polyester | 100 |
| Tolylene diisocyanate | 30 |
| Emulsifying agent ("Emulphor EL-179") | 0.3 |
| N-methyl morpholine | 1 |
| Water | 2 |
| M-dicyanamide | Variable |

The percent modulus lost after aging at 70° C. over water for various periods was determined, with the results shown in Table III.

Table III

| M | Parts | Percent Modulus Lost After Aging at 70° C. over Water | | | |
|---|---|---|---|---|---|
|   |   | 1 week | 2 weeks | 3 weeks | 4 weeks |
| Zn | 0 | 35 | 51 | 78 |  |
| Zn | 2 | 100 |  |  |  |
| Zn | 4 | 100 |  |  |  |
| Sn | 1 | 74 |  |  |  |
| Sn | 2 | 92 |  |  |  |
| Na | 2 | 8 | 16 | 32 | 37 |
| Ca | 2 | 20 | 25 | 42 |  |
| Na | 4 | 9 | 17 | 25 | 31 |
| Ca | 4 | 20 | 25 | 41 |  |
| Mg | 2 | 14 | 25 | 37 |  |
| Mg | 4 | 18 | 26 | 39 |  |
| Sr | 2 | 17 | 26 | 40 |  |
| Sr | 4 | 19 | 21 | 33 |  |

While it is not desired to limit the invention to any particular theory of operation, it is interesting to note that the moisture-induced deterioration of ordinary polyester-urethane rubbers is apparently associated with hydrolysis of the ester groups and the urethane groups, since Brockhagen (Kunststoffe 44, 555–8) found soluble polyester fragments in the degraded rubber. Thus, the polyester used in the above example degrades rapidly at 70° C. and slowly at room temperature if it contains water, and the amount of degradation depends on the amount of water added. Soaking samples of polyester-urethane foam in buffered solutions showed that degradation was slow at pH 8–9 and very rapid at pH 2–4. However, materials which one would expect to neutralize any acid already present or acid that might be formed by hydrolysis did not, in general, have any beneficial effect as far as mitigation of such degradation was concerned. As noted above, various metallic compounds proved to be no good, and in fact in some cases were harmful, and no benefit was derived from various organic acid acceptors, such as are used to stabilize polyvinyl chloride. The discovery of the effectiveness of metallic dicyanamides was therefore quite unexpected, as noted previously.

The stabilized or preserved solid or foamed polyester-urethane rubber composition of the invention is useful in many applications, such as the manufacture of tires, hose, belts and various other mechanical rubber goods, as well as cushions, mattresses, etc., and is a decided improvement over unstabilized polyester-urethane rubber for use in such applications.

Having thus described my invention, what I claim and desire to protect by Letters Patent is:

1. A polyester-polyurethane polymer containing at least 0.1 part by weight, per 100 parts of said polymer, of a metallic dicyanamide selected from the group consisting of alkali and alkaline earth metal dicyanamides, said polymer being a reaction product of an organic polyisocyanate selected from the group consisting of diisocyanates and triisocyanates with a polyester which is a reaction product of a glycol and a dicarboxylic acid.

2. A foamed rubbery polymer as in claim 1.

3. A polymer as in claim 1, in which the metallic dicyanamide is sodium dicyanamide.

4. A foamed rubbery polymer as in claim 3.

References Cited in the file of this patent

UNITED STATES PATENTS

| 2,758,985 | Strain | Aug. 14, 1956 |
| 2,760,953 | Seeger | Aug. 28, 1956 |
| 2,780,606 | Hoppe et al. | Feb. 5, 1957 |